United States Patent
Yang et al.

(10) Patent No.: US 9,749,073 B2
(45) Date of Patent: Aug. 29, 2017

(54) CLOCK RECOVERY IN A PACKET BASED NETWORK

(71) Applicant: Telefonaktiebolaget L M Ericsson (publ), Stockholm (SE)

(72) Inventors: Qingfeng Yang, Beijing (CN); Francesco Pasio, Genoa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 15 days.

(21) Appl. No.: 14/906,893

(22) PCT Filed: Jul. 23, 2013

(86) PCT No.: PCT/CN2013/079900
§ 371 (c)(1),
(2) Date: Jan. 21, 2016

(87) PCT Pub. No.: WO2015/010250
PCT Pub. Date: Jan. 29, 2015

(65) Prior Publication Data
US 2016/0156427 A1 Jun. 2, 2016

(51) Int. Cl.
*H04J 3/06* (2006.01)

(52) U.S. Cl.
CPC .......... *H04J 3/0685* (2013.01); *H04J 3/0641* (2013.01); *H04J 3/0658* (2013.01); *H04J 3/0667* (2013.01)

(58) Field of Classification Search
None
See application file for complete search history.

(56) References Cited

U.S. PATENT DOCUMENTS

| | | | | |
|---|---|---|---|---|
| 5,475,717 A | * | 12/1995 | Cordonnier | H04J 3/0679 370/507 |
| 5,577,075 A | * | 11/1996 | Cotton | G06F 1/04 370/516 |
| 6,516,422 B1 | | 2/2003 | Doblar et al. | |
| 6,628,674 B1 | * | 9/2003 | Tanonaka | H04J 3/0641 370/503 |
| 7,613,212 B1 | | 11/2009 | Raz et al. | |

(Continued)

OTHER PUBLICATIONS

International Preliminary Report on Patentability for International Patent Application No. PCT/CN2013/079900, mailed Feb. 4, 2016, 5 pages.

(Continued)

*Primary Examiner* — Hong Cho
(74) *Attorney, Agent, or Firm* — Withrow & Terranova, PLLC (57) ABSTRACT

A technique for facilitating clock recovery in a node of a packet-based network is disclosed. The node is synchronized with other nodes based on a master-slave clock mechanism. A list of backup master clock node is maintained for the node, which includes at least one backup master clock node for the node, and in response to occurrence of a synchronization related event, a master clock node of the node is switched from the current master clock node to a backup master clock node selected from the list. A master clock node reselection message is generated and transmitted to the switched backup master clock node for the switched backup master clock node to reselect its master clock node.

21 Claims, 4 Drawing Sheets

(56) References Cited

U.S. PATENT DOCUMENTS

2006/0280182 A1* 12/2006 Williams .............. H04J 3/0632
 370/394
2011/0158120 A1   6/2011 Hamasaki et al.

OTHER PUBLICATIONS

Author Unknown, "Distribution of timing information through packet networks," Telecommunication Standardization Sector of ITU, ITU-T, G.8264/Y.1364, Oct. 29, 2008, International Telecommunication Union, 36 pages.

Author Unknown, "IEEE Standard for a Precision Clock Synchronization Protocol for Networked Measurement and Control Systems," IEEE Std 1588-2008, Chapter 6, Jul. 24 2008, IEEE, pp. 16-37.

International Search Report and Written Opinion for International Patent Application No. PCT/CN2013/079900, mailed Apr. 16, 2014, 11 pages.

* cited by examiner

CLOCK RECOVERY IN A PACKET BASED NETWORK

This application is a 35 U.S.C. §371 national phase filing of International Application No. PCT/CN2013/079900, filed Jul. 23, 2013, the disclosure of which is incorporated herein by reference in its entirety.

TECHNICAL FIELD

The present disclosure generally relates to clock recovery in a packet based network.

BACKGROUND

The wideband mobile communication technologies, such as Long Term Evolution-Time Division Duplex (LTE-TDD), Mobile WiMAX/TDD, Time Division-Synchronous Code Division Multiple Access (TD-SCDMA) and Femto-cell, etc, have introduced high requirements on clock synchronization. The clock synchronization includes not only frequency synchronization but phase/time synchronization. The general requirement on the air interface is a frequency accuracy of 50 ppb (parts per billion) and a phase/time accuracy of the order of 1 μsec. For example, the phase accuracy is ±3 μsec for a CDMA2000 system, ±5 μsec for a LTE-TDD large cell and ±1.5 μsec for a LTE-TDD small cell.

There are various types of synchronization technologies, including time related and frequency related synchronization protocols. An example of time related synchronization protocol is the IEEE 1588 standard, also known as "Precision Clock Synchronization Protocol for Networked Measurement and Control Systems" or "PTP" for short, which is used for phase/time synchronization. Sync Ethernet (SyncE) is a kind of frequency related synchronization protocol and is used for frequency synchronization over the Ethernet link. Both PTP and SyncE are based-on a master-slave mechanism. That is, a downstream node obtains a reference clock from its upstream node, and a master-slave clock relationship is formed between the nodes.

Figure 1:
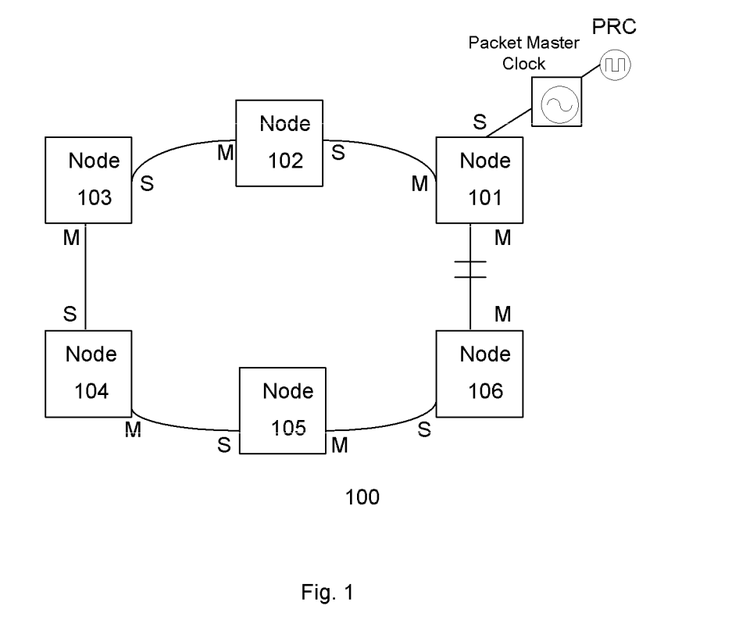
FIG. 1 illustrates a schematic network 100 synchronized by PTP/SyncE.

FIG. 1 illustrates a schematic network 100 synchronized by e.g. PTP/SyncE. The network 100 includes nodes 101, 102, 103, 104, 105 and 106. The node 101 obtains a reference clock from a packet master clock capable of providing a reliable Primary Reference Clock (PRC) such as an atomic clock or GPS disciplined oscillator. The port of the node 101 that connects to the packet master clock is indicated as "slave" (S). Then the node 102 obtains the reference clock from the node 101 according to PTP or SyncE. The node 101 becomes the master clock node of the node 102 and the node 102 becomes the slave clock node of the node 101. As shown in FIG. 1, to point out the clock distribution path in the network, the port of the node 101 that connects to the node 102 is indicated as "master" (M), and the port of the node 102 that connects to the node 101 is indicated as S. The clock is in turn distributed to other nodes 103-106 and all the nodes in the network are synchronized. As shown in FIG. 1, the link between the node 101 and the node 106 is blocked to avoid timing loop on the network. The two ports on the link between the node 101 and the node 106 are both indicated as M, since no reference clock is obtained from these ports.

However, synchronization of a node may be lost due to change of the network topology or link/node failure. Assume that the topology of the network 100 is changed such that the link between the node 103 and node 104 is blocked but the link between the node 101 and node 106 is reconnected. Such a change will cause PTP/SyncE system re-constructing, which is time consuming according to the current protocols. For example, the master-slave relationship and the SyncE clock chain are built up through SyncE initiative message exchanging, which is a layer 2 message type, while SyncE is a layer 1 fast clock signal. Due to slow detection of synchronization loss by Ethernet Synchronization Message Channel (ESMC), it typically takes several seconds to re-establish the SyncE clock chain. Similarly, for PTP, the Master/Slave relationship and PTP hierarchy are built up through PTP initiative messages exchanging, and the PTP port in the PTP hierarchy uses its slow Announce message, which is typically 1 packet in 2 seconds, to detect a synchronization loss. As a result, a node loosing sync due to a network failure may take minutes to re-establish synchronization. The slow clock recovery in the network leads to frequency and time shift and an undesirable long network downtime.

SUMMARY

Therefore, it is an object of the present disclosure to solve one of the above-mentioned problems.

According to an aspect of the present disclosure, a method for facilitating clock recovery in a node of a packet-based network which is synchronized with other nodes based on a master-slave clock mechanism is provided. The method comprises maintaining a list of backup master clock node which includes at least one backup master clock node for the node and in response to occurrence of a synchronization related event, switching a master clock node of the node from the current master clock node to a backup master clock node selected from the list. The method further comprises generating a master clock node reselection (MR) message, and transmitting the generated message to the switched backup master clock node for the switched backup master clock node to reselect its master clock node.

According to another aspect of the present disclosure, a node capable of synchronizing to other nodes based on a master-slave clock mechanism in a packet-based network is provided. The node comprises a clock recovery controlling unit and a transceiver. The clock recovery controlling unit is adapted to maintain a list of backup master clock node which includes at least one backup master clock node for the node, in response to occurrence of a synchronization related event, switch a master clock node of the node from the current master clock node to a backup master clock node selected from the list, and generate a master clock node reselection message. The transceiver is adapted to transmit the generated message to the switched backup master clock node for the switched backup master clock node to reselect its master clock node.

According to a further aspect of the disclosure, a device for facilitating clock recovery in a node of a packet-based network which is synchronized with other nodes based on a master-slave clock mechanism is provided. The device comprises a processing unit and a memory storing program codes. When the program codes are loaded into the processing unit, the processing unit is adapted to maintain a list of backup master clock node which includes at least one backup master clock node for the node, in response to occurrence of a synchronization related event, switch a master clock node of the node from the current master clock node to a backup master clock node selected from the list, and generate a master clock node reselection message to be transmitted to the switched backup master clock node for the switched backup master clock node to reselect its master clock node.

By switching to a backup master clock node upon detection of synchronization loss and propagating the MR message to the affected network nodes, the clock source may be quickly located and the clock may be recovered in a short time period.

BRIEF DESCRIPTION OF THE DRAWINGS

The invention will be described in detail by reference to the following drawings, in which.

DETAILED DESCRIPTION

Embodiments of the present disclosure will be described more fully hereinafter with reference to the accompanying drawings, in which embodiments of the present disclosure are shown. This invention may, however, be embodied in many different forms and should not be construed as limited to the embodiments set forth herein. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present disclosure is described below with reference to block diagrams and/or flowchart illustrations of methods, apparatus (systems) and/or computer program products according to embodiments of the present disclosure. It is understood that blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present disclosure may be embodied in hardware and/or in software (including firmware, resident software, micro-code, etc.). Furthermore, the present disclosure may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Although the present invention is described with reference to an Ethernet in the context, the skilled in the art should understand that the present invention is not limited to this, but can indeed be applied to all existing and future packet-based communication networks that require clock recovery. Although specific terms are used here, such as node, it should be understood that the invention is not limited to those specific terms but can be applied to all similar entities.

Embodiments of the present disclosure will be described below with reference to the drawings.

To facilitate a fast clock recovery, it is proposed to introduce a backup master clock node for a node and propagate a master clock node reselection message to the affected nodes in case of a loss of synchronization. The propagation throughout the affected nodes of the network may quickly locate a new clock source and restore the synchronization of the network.

A backup master clock node is a backup for the current master clock node. A node may switch to its backup master clock node in case it cannot obtain a reference clock from its current master clock node due to e.g. network topology change, node/link failure, etc. For each node in a network, a list of backup master clock node which includes at least one backup master clock node for the node may be configured manually or automatically. For example, a neighbouring node of the node may be added to the list if it is capable of providing a reference clock to the node. It should be noted that the node does not have to be directly connected to its neighbouring node at the physical layer. For example, in case of PTP, they can be connected by an IP connection through other intermediate nodes. The list may be automatically updated upon detection of a topology change of the network. If there are more than one backup master clock nodes in the list, each may be set a priority.

Taking the example of FIG. 1, the node 102 is a slave node of its current master clock node 101. The neighbouring node 103 is on the same hierarchy as the node 102 in the synchronization ring and could possibly provide a reference clock to the node 102 in case that the node 102 loses synchronization from the node 101. Thus, the node 102 may select the node 103 as its backup master clock node and add node 103 in its list of backup master clock node. However, a node that could not provide a reference clock, e.g. a node on a subring or subbranch of the node 102 (not shown), cannot become the backup master clock node. Similarly, the node 104 may be the backup master clock node of the node 103, the node 105 may be the backup master clock node of the node 104, the node 106 can be the backup master clock node of the node 105, and the node 101 may be the backup master clock node of the node 106.

Figure 2:
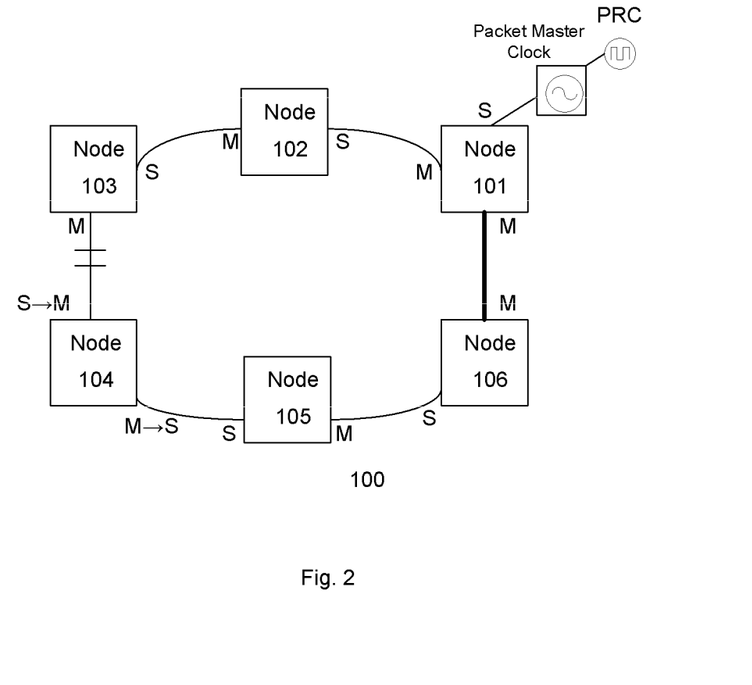
FIGS. 2 to 4 illustratively show an example of clock recovery in the network 100 in accordance to an embodiment of the present disclosure.
Figure 3:
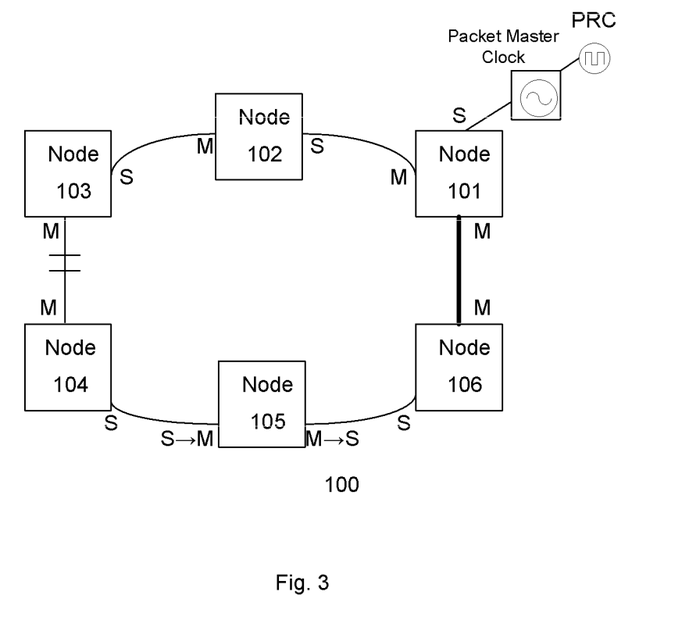
Figure 4:
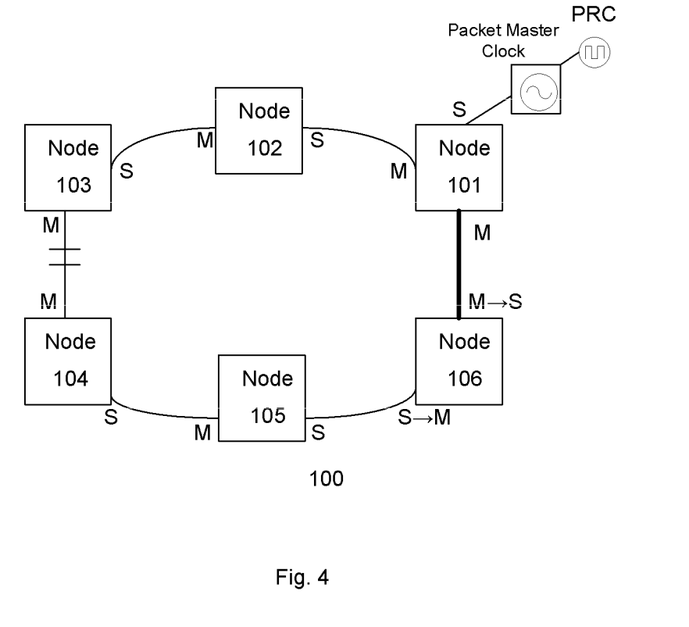

FIGS. 2 to 4 illustratively show an example of clock recovery in the network 100 in accordance to an embodiment of the present disclosure.

As shown in FIG. 2, the topology of the network 100 is changed as compared with that in FIG. 1. The link between the nodes 103 and 104 is blocked, while the link between the nodes 101 and 106 is reconnected. As a slave clock node of the node 103, the node 104 detects a loss of synchronization from the node 103, e.g. via Operation Administration and Maintenance (OAM)/Physical layer (PHY) hardware. The node 104 then switches the master clock node from its current master clock node (i.e. the node 103) to a backup master clock node selected from its list of backup master clock node (e.g. the node 105). If there are more than one backup master clock node, a node with the highest priority may be selected. In an example, the switching can comprise changing status of a port of the node 104 which is associated with the switched backup master clock node 105. For instance, as shown in FIG. 2, the SyncE/PTP port of the node 104 that connects to the node 105 is changed from M to S, and the other port of the node 104 is changed from S to M accordingly. The node 104 may determine if it can obtain a reference clock from the switched backup master clock node 105. In this scenario, the node 105 is still locked to the node 104 and is sending Do Not Use (DNU)/Delay_req toward the node 104. Therefore, the node 104 can not obtain the reference clock from the node 105, and goes into holdover/set itself as Grandmaster. The node 104 generates a MR message, and transmits it to the switched backup master clock node 105 to signal the node 105 to reselect its master clock node.

The MR message may be implemented by various protocols. In one embodiment, the MR message is implemented by modifying an Ethernet Synchronization Message Channel (ESMC) event message. The below table 1 shows the EMSC PDU format and field allocation.

TABLE 1

ESMC PDU format

| Octet number | Size | Field |
|---|---|---|
| 1-6 | 6 octets | Destination address = 01-80-C2-00-00-02 |
| 7-12 | 6 octets | Source address |
| 13-14 | 2 octets | Slow protocol Ethertype = 88-09 |
| 15 | 1 octets | Slow protocol subtype = 0x0A |
| 16-18 | 3 octets | ITU-OUI = 00-19-A7 |
| 19-20 | 2 octets | ITU-T subtype |
| 21 | 4 bits | Version |
|  | 1 bit | Event flag |
|  | 3 bits | Reserved (Use bit 0 == '1' for SyncE to signal downstream reselection; use bit 1 == '1' for PTP to signal downstream reselection) |
| 22-24 | 3 octets | Reserved |
| 24-1514 | 36-1490 octets | Data and padding (Use lowest 10 octets of padding for PTP Port Identity) |
| Last 4 | 4 octets | Frame check sequence |

The ESMC defines "event message type" to handle time-sensitive events, which may be used to signal the reselection among the backup master clock nodes. The MR message may be generated based on the traditional ESMC event message, except that the first reserved bit (the $6^{th}$ bit in the $21^{st}$ octet) is set to '1' for SyncE to signal downstream master reselection, the second bit (the $7^{th}$ bit in the $21^{st}$ octet) is set to '1' for PTP to signal downstream master reselection.

Also for PTP, to facilitate the downstream node (i.e. node 105) determining if the message is from its current master clock node (i.e. node 104), the PTP port identity of the previous master port (indicated as "M" in FIG. 1) of node 104 is included in the lowest 10 octets of padding. It should be noted that the MR message may be implemented by any signaling other than the ESMC as illustrated in the table 1.

Continuing with FIG. 3, the node 105 receives the MR message from the node 104. The node 105 may determine if the MR message is from its current master clock node and ignore the MR message if it is not from the current master clock node. For the SyncE, the Source Address/message ingress port may be used to make the determination. For the PTP, the PTP port ID in the ESMC message 'padding' field may be used to make the determination. In FIG. 3, the MR message is received from the current master clock node 104, and the node 105 then switch its master clock node from the current master clock node 104 to a backup master clock node in its list of backup master node (e.g. the node 106). As shown in FIG. 3, similar to node 104 described above, the SyncE/PTP port of the node 105 that connects to the node 106 is changed from M to S, and the other port of the node 105 is changed from S to M accordingly. The node 105 may determine if it can obtain a reference clock from the switched backup master clock node 106. In this scenario, the node 105 can not obtain the reference clock from the node 106, and goes into holdover/set itself as Grandmaster. The node 105 generates another MR message, and transmits it to the switched backup master clock node 106 to signal the node 106 to reselect its master clock node. The generated MR message may have the same format as that of the received MR message, except that the PTP port identity of the node 105 is included.

Continuing with FIG. 4, the node 106 receives the MR message from the node 105. The node 106 may determine if the MR message is from its current master clock node and ignore the MR message if it is not from the current master clock node. In FIG. 4, the MR message is received from the current master clock node 105, and the node 106 then switch its master clock node from the current master clock node 105 to a backup master clock node in its list of backup master clock node (e.g. the node 101). Similarly, as shown in FIG. 4, the SyncE/PTP port of the node 106 that connects to the node 101 is changed from M to S, and the other port of the node 106 is changed from S to M accordingly. The node 106 may determine if it can obtain a reference clock from the switched backup master clock node 101. In this scenario, the node 106 can obtain the reference clock from the node 101 since the node 101 is the master clock node connected to the PRC. In other words, the source of the clock has been located after propagation of the MR messages along the chain of backup master clock nodes. The node 106 does not have to generate and transmit a MR message to the node 101. The clock is then distributed from the master clock node 101 to the nodes 106, 105 and 104 according to the PTP or SyncE, and the clock synchronization is restored in the network 100. By switching to a backup master clock node and propagating the MR message among backup master clock nodes upon detection of loss of synchronization due to e.g. network topology change or link/node failure, the clock source may be located in a relatively short time period. The time for restoring synchronization of the network may be significantly reduced and the impacts of the phase/frequency shift may be alleviated.

In another embodiment, the node (e.g. 105, 106) may simply generate and transmit the MR message without determining if it can obtain the reference clock from the switched backup master clock node. In this case, after switching to the backup master clock node 101, the node 106 still generates and transmits the MR message to the node 101. However, the node 101 ignores the MR message received from the node 106, since the message is not from the current master clock node of the node 101. The propagation of the MR message ends at the node 101, and the clock is then distributed from the master clock node 101 to the nodes 106, 105 and 104 according to the PTP or SyncE. The step of determining if the node can obtain the reference clock from the switched backup master clock node is omitted and the procedure of clock recovery is even faster.

It should be noted that although the embodiments are described with reference to SyncE and PTP, the clock recovery method may be applied to any master-slave clock mechanism, including both the time related synchronization protocol and frequency related synchronization protocol. In addition to the Ethernet ring network, the method may be applied to networks of other types or topology, like Spanning Tree Protocol (STP), Rapid Spanning Tree Protocol (RSTP), VLAN based Spanning Tree Protocol, etc. The method may be also applied to any scale of network, even across different service providers' networks.

Figure 5:
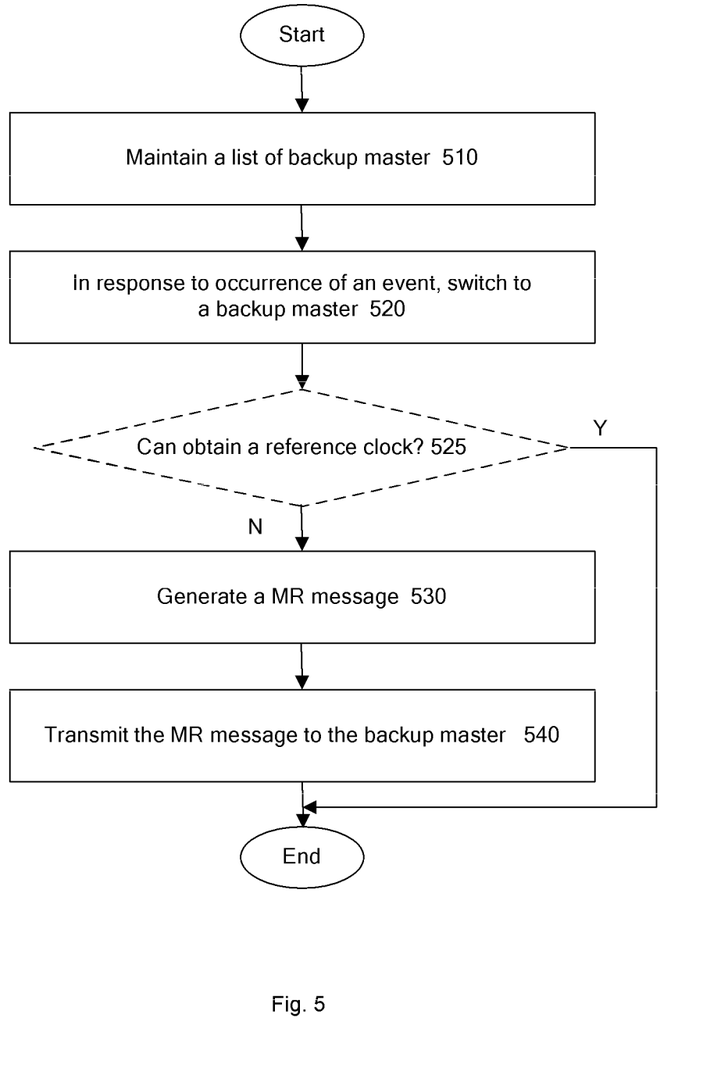
FIG. 5 illustratively shows a method 500 for facilitating clock recovery in a node of a packet-based network according to an embodiment of the present disclosure.

FIG. 5 illustratively shows a method 500 for facilitating clock recovery in a node of a packet-based network according to an embodiment of the present disclosure. The node is synchronized with other nodes based on a master-slave clock mechanism. At block 510, the node maintains a list of backup master clock node which includes at least one backup master clock node for the node. A neighbouring node of the node may be added to the list if it is capable of providing a reference clock to the node. The list may be automatically updated upon detection of a topology change of the network. At block 520, in response to occurrence of a synchronization related event, the node switches its master clock node from the current master clock node to a backup master clock node selected from the list. The node generates at block 530 a master clock node reselection message, and transmits at block 540 the generated message to the switched backup master clock node for the switched backup master clock node to reselect its master clock node. The synchronization related event may include detection of a loss of synchronization from the current master clock node or receiving of another master clock node reselection message from the current master clock node.

Prior to the generating, the node may determine at block 525 if the node can obtain a reference clock from the switched backup master clock node, and wherein the generating and transmitting may be performed only if the node cannot obtain a reference clock from the switched backup master clock node. The switching may comprise changing status of a port of the node which is associated with the switched backup master clock node. The master-slave clock mechanism may include a time related synchronization protocol and a frequency related synchronization protocol. The time related synchronization protocol may be PTP, and the master clock node reselection message may include an ESMC event message which uses a first reserved bit indicating the reselection and padding octets indicating port identity of the node. The frequency related synchronization protocol may include a SyncE protocol, and the master clock node reselection message may include an ESMC event message which uses a second reserved bit indicating the reselection.

Figure 6:
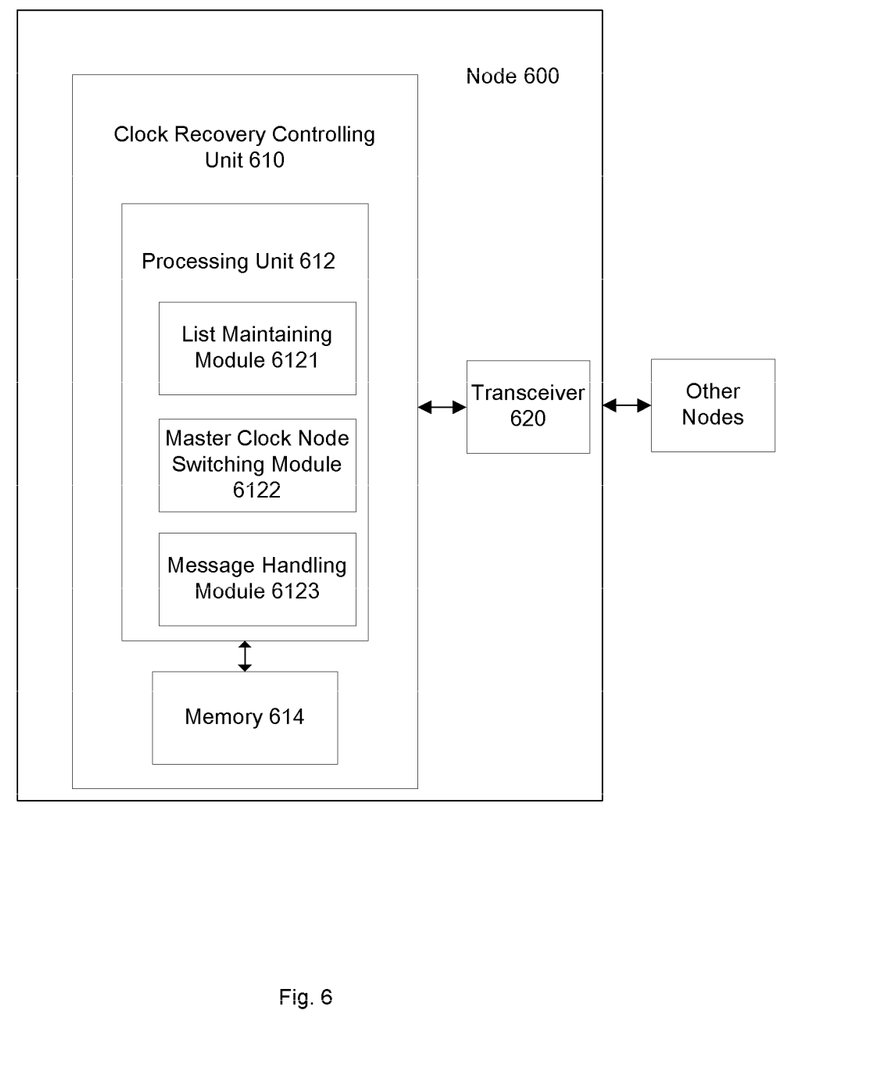
FIG. 6 illustratively shows a block diagram of a node 600 capable of synchronizing to other nodes in a packet-based network in accordance with an embodiment of the present disclosure.

FIG. 6 illustratively shows a block diagram of a node 600 capable of synchronizing to other nodes based on a master-slave clock mechanism in a packet-based network in accordance with an embodiment of the disclosure. The node 600 comprises a clock recovery controlling unit 610 and a transceiver 620. The clock recovery controlling unit 610 is adapted to maintain a list of backup master clock node which includes at least one backup master clock node for the node. The clock recovery controlling unit 610 may be adapted to add a neighbouring node of the node to the list if it is capable of providing a reference clock to the node, and automatically update the list upon detection of a topology change of the network. The clock recovery controlling unit 610 is further adapted to, in response to occurrence of a synchronization related event, switch a master clock node of the node from the current master clock node to a backup master clock node selected from the list, and generate a master clock node reselection message. The transceiver 620 is adapted to transmit the generated message to the switched backup master clock node for the switched backup master clock node to reselect its master clock node. The synchronization related event may include detection of a loss of synchronization from the current master clock node or receiving of another master clock node reselection message from the current master clock node. The clock recovery controlling unit 610 may be further adapted to prior to the generating, determine if the node can obtain a reference clock from the switched backup master clock node, and wherein the clock recovery controlling unit 620 may be further adapted to generate the message only if the node cannot obtain a reference clock from the switched backup master clock node. In an example, the clock recovery controlling unit 610 is adapted to switch the master clock node by changing status of a port of the node which is associated with the switched backup master clock node.

The clock recovery controlling unit 610 may be implemented by software or hardware or a combination thereof. FIG. 6 shows a software-based implementation of the clock recovery controlling unit 610. Here, the clock recovery controlling unit 610 comprises a processing unit 612, which may be provided on a single chip or a chip module and which may be any processor or computer device that performs operations based on program codes or instructions stored in a memory 614. Program codes are fetched from the memory 614 and loaded into the processing unit 612 in order to perform the steps described in connection with FIG. 5. In particular, the clock recovery controlling unit 610 include a list maintaining module 6121 for maintaining a list of backup master clock node which includes at least one backup master clock node for the node, a master clock node switching module 6122 for in response to occurrence of a synchronization related event, switching a master clock node of the node from the current master clock node to a backup master clock node selected from the list, and a message handling module 6123 for generating a master clock node reselection message to be transmitted to the switched backup master clock node for the switched backup master clock node to reselect its master clock node. The clock recovery controlling unit 610 may share the same processing unit or memory with the node, or use separate hardware.

While the exemplary embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore it is intended that the present invention is not be limited to the particular embodiment disclosed as the best mode contemplated for carrying out the present invention, but that the present invention include all embodiments falling within the scope of the appended claims.

The invention claimed is:

1. A method for facilitating clock recovery in a node of a packet-based network which is synchronized with other nodes based on a master-slave clock mechanism, the method comprising:
maintaining a list of backup master clock nodes which includes at least one backup master clock node for the node;
in response to occurrence of a synchronization related event, switching a master clock node of the node from the current master clock node to a backup master clock node selected from the list;
generating a master clock node reselection message; and
transmitting the generated message to the switched backup master clock node for the switched backup master clock node to reselect its master clock node.

2. The method of claim 1, wherein the synchronization related event includes detection of a loss of synchronization from the current master clock node or reception of another master clock node reselection message from the current master clock node.

3. The method of claim 1, further comprising prior to the generating, determining if the node can obtain a reference clock from the switched backup master clock node, and wherein the generating and transmitting are performed only if the node can not obtain a reference clock from the switched backup master clock node.

4. The method of claim 1, wherein the switching comprises changing status of a port of the node which is associated with the switched backup master clock node.

5. The method of claim 1, wherein the master-slave clock mechanism includes a time related synchronization protocol.

6. The method of claim 5, wherein the time related synchronization protocol is a Precision Time Protocol, and the master clock node reselection message includes an Ethernet Synchronization Message Channel event message which uses a first reserved bit indicating the reselection and padding octets indicating a port identity of the node.

7. The method of claim 1, wherein the master-slave clock mechanism includes a frequency related synchronization protocol.

8. The method of claim 7, wherein the frequency related synchronization protocol includes a Synchronous Ethernet protocol, and the master clock node reselection message includes an Ethernet Synchronization Message Channel event message which uses a second reserved bit indicating the reselection.

9. The method of claim 1, wherein the maintaining comprises adding a neighbouring node of the node to the list if the neighbouring node is capable of providing a reference clock to the node.

10. The method of claim 1, wherein the maintaining comprises automatically updating the list upon detection of a topology change of the network.

11. A node capable of synchronizing to other nodes based on a master-slave clock mechanism in a packet-based network, the node comprising:
a clock recovery controlling unit adapted to
maintain a list of backup master clock nodes which includes at least one backup master clock node for the node,
in response to occurrence of a synchronization related event, switch a master clock node of the node from the current master clock node to a backup master clock node selected from the list, and
generate a master clock node reselection message; and
a transceiver adapted to transmit the generated message to the switched backup master clock node for the switched backup master clock node to reselect its master clock node.

12. The node of claim 11, wherein the synchronization related event includes detection of a loss of synchronization from the current master clock node or reception of another master clock node reselection message from the current master clock node.

13. The node of claim 11, wherein the clock recovery controlling unit is further adapted to prior to the generating, determine if the node can obtain a reference clock from the switched backup master clock node, and wherein the clock recovery controlling unit is adapted to generate the message only if the node can not obtain a reference clock from the switched backup master clock node.

14. The node of claim 11, wherein the clock recovery controlling unit is adapted to switch the master clock node of the node from the current master clock node to the backup master clock node by changing status of a port of the node which is associated with the switched backup master clock node.

15. The node of claim 11, wherein the master-slave clock mechanism includes a time related synchronization protocol.

16. The node of claim 15, wherein the time related synchronization protocol is a Precision Time Protocol, and the master clock node reselection message includes an Ethernet Synchronization Message Channel event message which uses a first reserved bit indicating the reselection and padding octets indicating a port identity of the node.

17. The node of claim 11, wherein the master-slave clock mechanism includes a frequency related synchronization protocol.

18. The node of claim 17, wherein the frequency related synchronization protocol includes a Synchronous Ethernet protocol, and the master clock node reselection message includes an Ethernet Synchronization Message Channel event message which uses a second reserved bit indicating the reselection.

19. The node of claim 11, wherein the clock recovery controlling unit is further adapted to add a neighbouring node of the node to the list if the neighbouring node is capable of providing a reference clock to the node.

20. The node of claim 11, wherein the clock recovery controlling unit is further adapted to automatically update the list upon detection of a topology change of the network.

21. A device for facilitating clock recovery in a node of a packet-based network which is synchronized with other nodes based on a master-slave clock mechanism, the device comprising:
a list maintaining module for maintaining a list of backup master clock nodes which includes at least one backup master clock node for the node;
a master clock node switching module for in response to occurrence of a synchronization related event, switching a master clock node of the node from the current master clock node to a backup master clock node selected from the list; and
a message handling module for generating a master clock node reselection message to be transmitted to the switched backup master clock node for the switched backup master clock node to reselect its master clock node.

\* \* \* \* \*